(12) United States Patent
Wulf

(10) Patent No.: US 11,136,041 B2
(45) Date of Patent: Oct. 5, 2021

(54) APPARATUS AND METHOD FOR MONITORING THE ACTIVITY OF A DRIVER OF A VEHICLE

(71) Applicant: Robert Bosch GmbH, Stuttgart (DE)

(72) Inventor: Felix Wulf, Besigheim (DE)

(73) Assignee: Robert Bosch GmbH, Stuttgart (DE)

(*) Notice: Subject to any disclaimer, the term of this patent is extended or adjusted under 35 U.S.C. 154(b) by 224 days.

(21) Appl. No.: 16/445,961

(22) Filed: Jun. 19, 2019

(65) Prior Publication Data

US 2020/0001882 A1    Jan. 2, 2020

(30) Foreign Application Priority Data

Jun. 27, 2018 (DE) .......................... 102018210454.9

(51) Int. Cl.
*B60W 40/09* (2012.01)
*B60W 30/18* (2012.01)

(52) U.S. Cl.
CPC ............ *B60W 40/09* (2013.01); *B60W 30/18* (2013.01); *B60W 2420/42* (2013.01); *B60W 2540/106* (2013.01); *B60W 2540/12* (2013.01); *B60W 2540/18* (2013.01); *B60W 2900/00* (2013.01)

(58) Field of Classification Search
CPC .................................................... B60W 40/09
See application file for complete search history.

(56) References Cited

U.S. PATENT DOCUMENTS 9,308,914 B1 *   4/2016   Sun ........................ B60K 28/06

FOREIGN PATENT DOCUMENTS

| DE | 102016007187 A1 | 6/2017 |
| DE | 102016203398 A1 | 9/2017 |
| DE | 102016217772 A1 | 3/2018 |

* cited by examiner

*Primary Examiner* — Imran K Mustafa
(74) *Attorney, Agent, or Firm* — Norton Rose Fulbright US LLP; Gerard Messina

(57) ABSTRACT

An apparatus and a method are described for monitoring the activity of a driver of a vehicle, which apparatus has a device for monitoring several driver activities, by way of which various driver activities at the actuator for influencing vehicle motion are detected; and a device for evaluating the driver activity intensity level is provided, by way of which the intensity of the respective driver activity with regard to the urgency of the respective vehicle reaction is evaluated and is outputted as an intensity of the driver intervention; one of several different system reactions being selected depending on the intensity of the driver intervention, and the selected system reaction being executed.

20 Claims, 2 Drawing Sheets

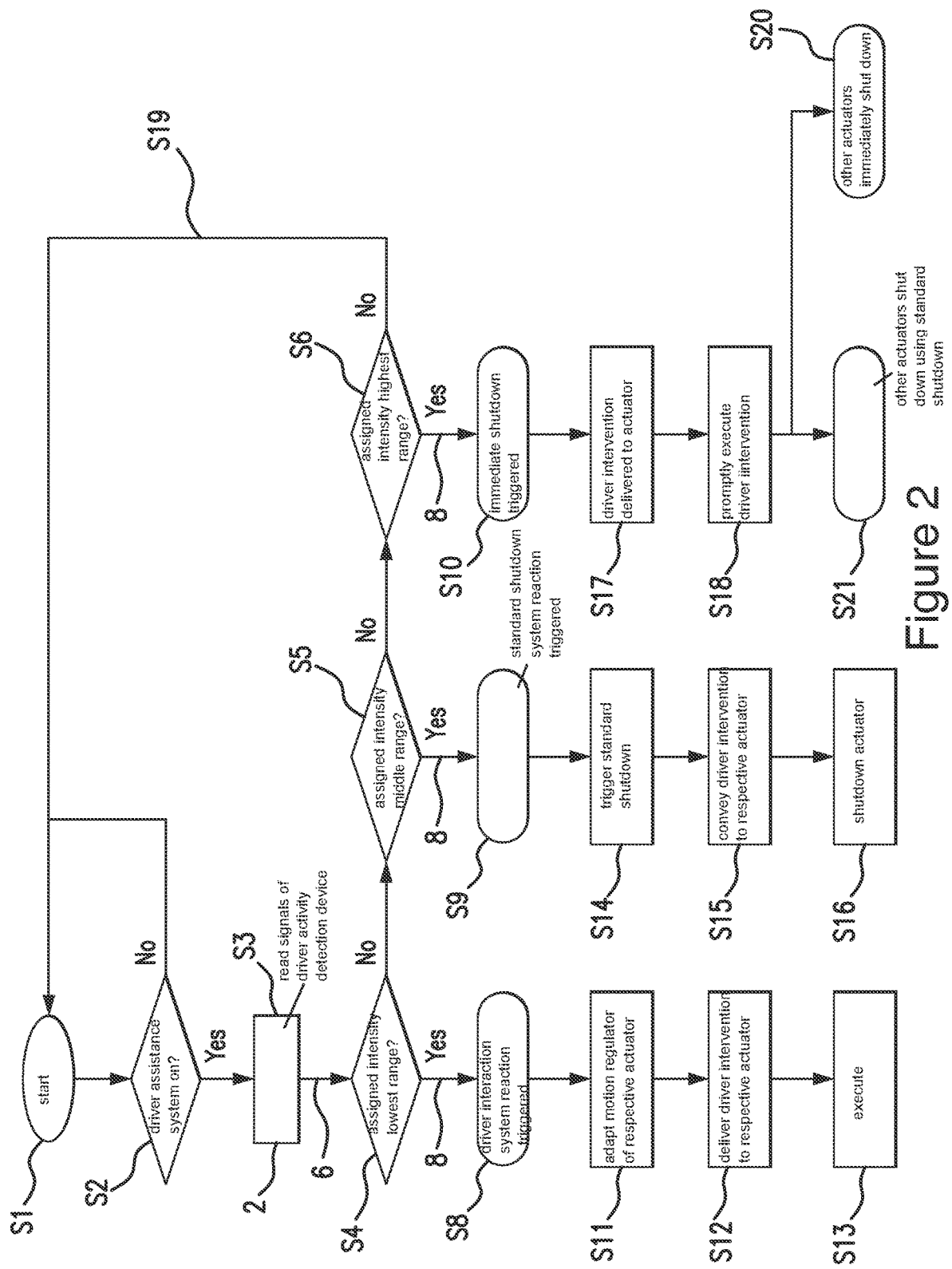

APPARATUS AND METHOD FOR MONITORING THE ACTIVITY OF A DRIVER OF A VEHICLE

FIELD OF THE INVENTION

The present invention relates to an apparatus and a method for monitoring the activity of a driver of a vehicle, which apparatus has a device for monitoring several driver activities, by way of which various driver activities at an actuator for influencing vehicle motion are detected; and a device for evaluating the driver activity intensity is provided, by way of which the intensity of the respective driver activity with regard to the urgency of the respective vehicle reaction is evaluated and is outputted as an intensity of the driver intervention; one of several different system reactions is selected depending on the intensity of the driver intervention, and the selected system reaction is executed.

BACKGROUND INFORMATION

German Published Patent Application No. 10 2016 007 187 discloses a method for deactivating an automated driving function of a vehicle, in particular a highly automated or autonomous driving function, the driving function being deactivated if a driver of the vehicle carries out a steering intervention or pedal intervention at an intensity exceeding a predefinable deactivation threshold.

SUMMARY

An object of the present invention is to monitor the driver of a vehicle, to recognize his or her activities, and to execute at least one of several system reactions depending on the urgency of those activities.

According to the present invention this is achieved by way of the features of the independent claims. Advantageous refinements and embodiments are evident from the dependent claims.

Advantageously, provision is made that in order to monitor the activity of a driver of a vehicle, one or more steering wheel angle sensors are used in order to measure the steering angle of the steering wheel. Alternatively thereto or in combination therewith, provision can be made that one or several capacitive steering wheel sensors, or one or several steering wheel torque sensors, are also used in addition to steering wheel angle sensors. A steering wheel angle sensor detects the activities of a driver at the steering wheel, the result being (in the case of non-automated vehicles) a determination of the vehicle motion direction. In an automated vehicle, this actuation is replaced by a driver assistance system.

The terms "driver assistance system" and "automated vehicle" are to be understood in the context of the present invention in the manner in which the term "system" has been described and used in the standard (SAE Levels 1 to 4 of SAE Standard J3016).

The driver assistance system can be made up, for example, of the following constituents: trajectory planning, motion regulation, actuator management, and driving maneuver function.

The term "trajectory planning" is to be understood in the context of the present invention in such a way what is meant thereby is the method and the apparatus that plan the trajectories of the vehicle.

The term "motion regulation" is to be understood in the context of the present invention in such a way that what is meant thereby is the method and apparatus that regulate the planned trajectories of the vehicle.

The term "actuator management" is to be understood in the context of the present invention in such a way that what is meant thereby is the method and the apparatus that control the respective actuators.

The term "driving maneuver function" is to be understood in the context of the present invention in such a way that what is meant thereby is the method and the apparatus that select the most suitable driving maneuver in the respective driving situation.

Advantageously, provision is made that monitoring of the activity of a driver of a vehicle occurs by way of one or several pedal-based apparatuses with which a driver activity can be detected. If the driver wishes to modify the vehicle speed or vehicle acceleration, this is effected in particular by way of the accelerator pedal and brake pedal in the vehicle. By way of example, brake pedal force sensors and/or accelerator pedal force sensors and/or brake pedal travel sensors and/or accelerator pedal travel sensors can be used.

Advantageously, provision is made that one or several switch-on/shutdown elements, which can be actuated by the driver, are used in order to monitor the activity of a driver. A driver activity can likewise be detected by the switching on or shutting down of the one or several driver assistance systems.

Advantageously, provision can be made that the activity of the driver is monitored by way of one or several interior cameras. Interior cameras image the vehicle passengers in the interior of the vehicle, in particular the driver him- or herself, and can recognize activity patterns. These imaged driver activities can be compared with stored movement patterns and evaluated. From that comparison, a driver command for a driver assistance system can be detected and implemented. The driver commands for driver assistance systems can be used, for example, to determine or modify the vehicle motion direction and/or the vehicle acceleration and/or to switch on or shut down one or several driver assistance systems.

It is furthermore advantageous that the apparatuses provided for monitoring the activity of a driver furnish one or several signals that are further processed in downstream evaluation devices and that reproduce the actuation activity of the driver at the respective sensor using appropriate variables. For example, upon actuation of an accelerator pedal sensor, a signal is outputted which indicates how intensely (from 0% to 100%) the pedal is being deflected.

It is particularly advantageous in this context that the urgency of the activity of a driver actuation provides an indication that indicates the force and/or speed and/or deflection of the monitoring device as a result of the driver activity. An example that may be mentioned is the speed with which an accelerator pedal is actuated (% per second), which indicates the urgency of the change in the acceleration of the vehicle.

Advantageously, provision is made that the magnitude of the urgency is compared with stored threshold values. It is particularly advantageous in this context that the range between two threshold values is defined as an urgency range, and is referred to in the context of the present invention as a "range."

Advantageously, provision is made that different stored threshold values are selected depending on the driver assistance systems active at the time. Each stored threshold value is to be understood here as a value matrix on the basis of which the unrestricted combination of different driver assistance systems results in a threshold value. It is particularly advantageous that various system reactions take place with respect to different active driver assistance systems, in order to make the transfer of vehicle guidance to the driver's control even more reliable and convenient.

Advantageously, provision is made that the detected urgency is assigned to one of, preferably, three ranges: a first, lowest range; a middle range; or a highest range.

The term "lowest range" is to be understood in the context of the present invention to mean that the lowest range is selected when the degree of urgency is between zero and a first threshold value, and is thus below the middle range and the highest range.

The term "middle range" is furthermore to be understood in the context of the present invention to mean that the degree of urgency is between the first threshold value and a higher, second threshold value. The result is that the "middle range" is between the "low range" and the "high range."

The term "highest range" is furthermore to be understood in the context of the present invention to mean that the degree of urgency is between the second threshold value and an even higher, third threshold value, so that the "highest range" represents a degree of urgency that is greater than in the "low range" or the "middle range."

It is particularly advantageous that a system reaction is triggered if the degree of urgency is within a range.

Advantageously, provision is made that one or several system reactions are assigned for each range and are activated if the degree of urgency assumes a value within the assigned range.

Advantageously, provision is made that the system reaction being implemented is an immediate shutdown and/or a driver interaction and/or a standard shutdown.

The "immediate shutdown" system reaction is to be understood in the context of the present invention to mean that the overall system for vehicle guidance exhibits a system reaction in which control over the one or several actuators for vehicle guidance is returned to the driver immediately and as quickly as possible, and the assistance system or systems for various driving tasks is deactivated as quickly as possible. Until immediate shutdown, the actuators for vehicle guidance have been controlled by one or several driver assistance systems. The immediate shutdown causes the driver assistance systems to be shut down. An immediate shutdown can be triggered and executed by the actual actuator itself, with no control by the higher-order driver assistance system. Alternatively to or in combination therewith, provision can be made that the actuators of the other guidance channels are shut down not with an immediate shutdown but instead with a standard shutdown, for example if the deceleration of the vehicle requires an immediate shutdown while the transverse guidance of the vehicle does not require an immediate shutdown but a standard shutdown is instead sufficient for the purpose. Immediate shutdowns can be necessary for safety reasons, for example, but can also be motivated by particularly intense interventions by the driver.

The term "standard shutdown" is to be understood in the context of the present invention in such a way that what is meant thereby is a system reaction that is capable of returning to the driver in terms of his or her activities, in delayed fashion, control over one or several actuators. This delay is understood as a smooth and convenient shutdown in which the respective driver assistance system returns control to the driver by way of a shutdown process, for example a shutdown ramp. By way of example, it can take place in accordance with an intervention ramp having a defined increase.

The "driver interaction" system reaction is to be understood in the context of the present invention to mean that if the degree of urgency of the driver intervention is low, the corresponding assistance system is not shut down, but instead both the driver and the assistance system simultaneously have an influence on the motion of the vehicle. They interact with one another on the corresponding actuator. Driver interactions of this kind occur, for example, in lane-keeping assistance systems of SAE Level 2, in which the driver can adapt the position of the vehicle in the lane by slight actuation of the steering wheel without deactivating the system. The driver can thus intervene in regulating fashion in the actuator control application system by way of a low degree of urgency.

Implementation of the method according to the present invention in the form of a control element that is provided for a control device of a driver assistance system, or of a highly automated vehicle guidance system, of a motor vehicle is particularly significant. A program that is executable on a computation device, in particular on a microprocessor or signal processor, and is suitable for carrying out the method according to the present invention, is stored on the control element. The invention is therefore realized in this instance by a program stored on the control element, so that this control element equipped with the program represents the invention in the same manner as does the method for whose execution the program is suitable. An electrical memory medium, for example a read-only memory, can be utilized in particular as a control element.

Further features, potential applications, and advantages of the invention are evident from the description below of exemplifying embodiments of the invention which are depicted in the Figures of the drawings. All features described or depicted in that context, individually or in any combination, constitute the subject matter of the invention, regardless of their grouping in the claims or their internal references, and regardless of their respective presentation or depiction in the description or the drawings.

BRIEF DESCRIPTION OF THE DRAWINGS

FIG. 2 is an exemplifying flow chart of the method according to the present invention for monitoring the activity of a driver of a vehicle.

DETAILED DESCRIPTION

Figure 1:
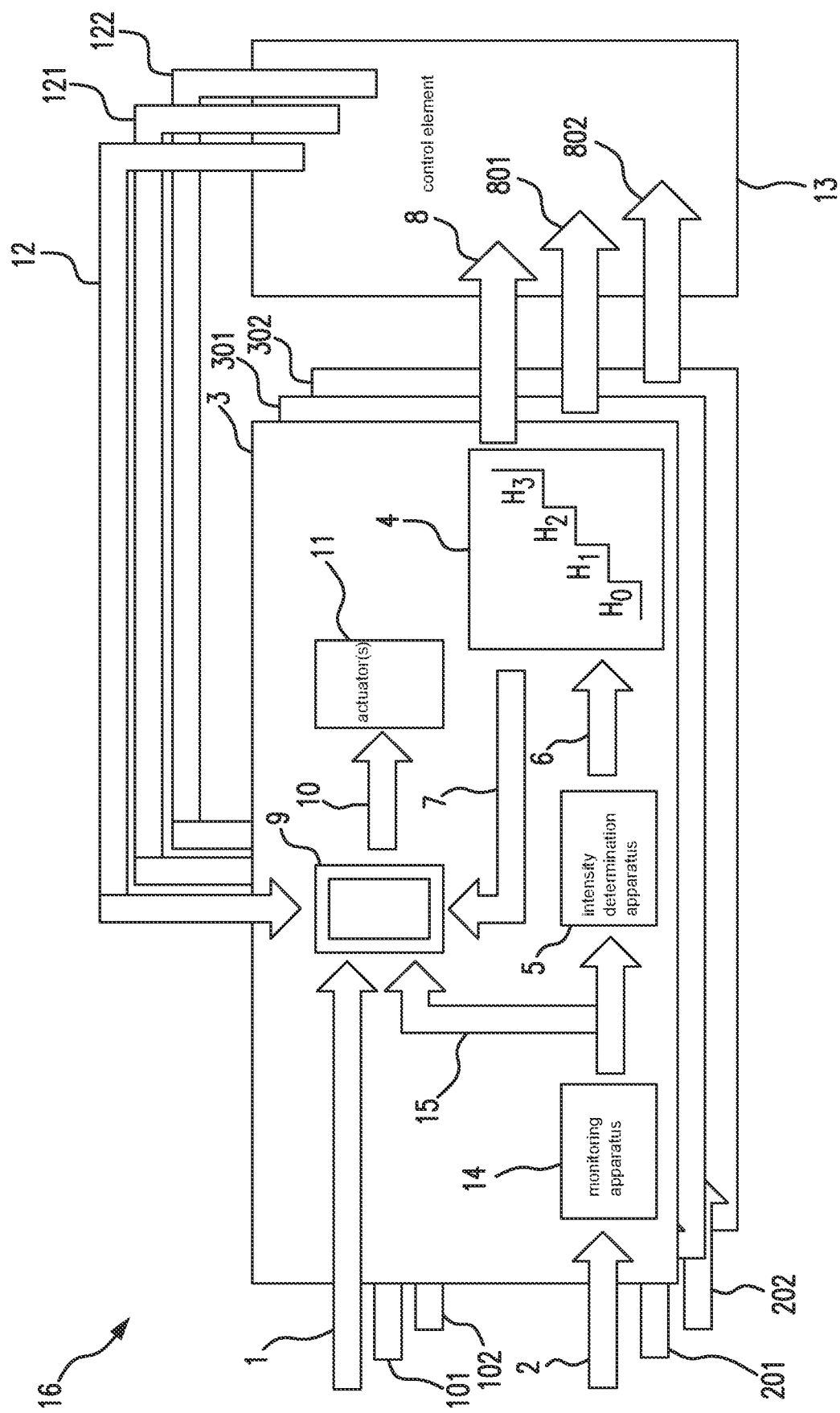
FIG. 1 shows an exemplifying device of an apparatus according to the present invention for monitoring the activity of a driver of a vehicle.

FIG. 1 schematically depicts an embodiment of a device 16 for monitoring several driver activities. Apparatus 16 monitors several activity channels 2, 201, 202, for example the transverse control of the vehicle, the acceleration of the vehicle, the deceleration of the vehicle, each channel applying control, by way of a driver assistance function, to an actuator for vehicle control. Monitoring by way of monitoring apparatus 14 detects the activity of the driver of vehicle 14 in terms of the respective vehicle guidance channel 2, 201, 202. The control exerted by driver 15 is evaluated in terms of its urgency by device 5 for determining the intensity of driver activity, and intensity 6 of the respective driver activity is defined therefrom. Intensity 6 of the respective driver activity is then compared, in device 4 for determining the driver activity intensity, with stored values constituting threshold values H0, H1, H2, H3, H4, intensity 6 of the respective driver activity being assigned to the respective appropriate range.

The ranges can be defined, by way of example, by the stored values H0, H1, H2, H3, H4, where H0<H1<H2<H3<H4 and where H0 means that no driver activity is present. The stored values are selected based on the currently active driver assistance system or on the combination of currently active driver assistance systems.

Intensity 6 of the respective driver activity is assigned to the lowest range if its value is between H1 and H2.

Intensity 6 of the respective driver activity is assigned to the middle range if its value is between H2 and H3.

Intensity 6 of the respective driver activity is assigned to the highest range if its value is between H3 and H4.

The thresholds are stored in a control device along with the assigned ranges, so that control element 13 can decide on the basis of the delivered urgency values, with the aid of the stored threshold values, whether a system reaction 7, 12, 121, 122 is to be triggered, and which one.

Considering, for example, a vehicle that is driving in highly automated fashion with no driver intervention: in the absence of actuation by the driver no activity signal at all, and also no urgency value, is produced. If the driver becomes alarmed due to a hazardous driving situation, however, and in reaction thereto actuates the brake pedal with full force, a driver activity signal is then generated by the pedal sensors and an urgency value is also calculated from it. That value is recognized by the apparatus for monitoring the activity of a driver of a vehicle 14, and the urgency value is compared with the stored threshold values. Because of the intense driver actuation, that intervention that has a high degree of urgency is assigned to the highest range. Given that urgency, an immediate shutdown is triggered, triggering an immediate shutdown 7 within the actuator (in the example of brake pedal actuation being considered, the actuator is a deceleration actuator). Because the urgency was assigned to the highest urgency range, an immediate shutdown 121, 122 is likewise triggered by control element 13 in the respective other actuators, so that the vehicle is immediately being controlled by the driver. With an assignment of the urgency value to the middle range, only the actuator affected, i.e. the deceleration actuator, would experience an immediate shutdown, whereas the other actuator channels, for example the steering actuator, are shut down only with a standard shutdown, since the urgency for an immediate shutdown of the other actuator channels is not present.

FIG. 2 schematically depicts an embodiment of a method for monitoring the activity of a driver of a vehicle. To begin with, a check is made S2 as to whether the driver assistance system is switched on. If the driver assistance system is not activated, execution returns to the beginning S1. If driver assistance system 16 is activated, the method is continued by the fact that in step S3, output signals 2 of at least one driver activity detection device are read in. Preferably, driver activities of several channels, for example signals 2 of a steering angle sensor, signals 201 of a brake pedal sensor, or signals 202 of an accelerator pedal sensor, are detected by way of different sensors and forwarded. In step S3, an urgency value is ascertained from the driver activity values, that value indicating how quickly the driver activity needs to be implemented by the vehicle systems. For this, the ascertained urgency value is compared with the stored threshold values H0 to H3 and assigned to one of the ranges that provide different system reactions depending on the driver activities.

The next step S4 checks whether the intensity of driver intervention 8, i.e. the urgency value, is to be assigned S4 to the lowest range. If the lowest range has been selected, the method is continued into steps S8, S11, S12, and S13 by the fact that the "driver interaction" system reaction is triggered S8 for the actuator that has received the driver's intervention. Since the driver activity is only minor and the urgency also assumes only low values, this actuator remains active and the driver activities are passed through to the actuator as positioning signals, so that the driver can intervene in the vehicle guidance system using only minor activities, for example to adjust the transverse location of the vehicle in the lane being traveled in. In this context, the motion regulator of the respective actuator is adapted S11 to the driver intervention, and the driver intervention is delivered S12 to the respective actuator and executed S13 by the respective actuator. The other actuators of the other channels continue to operate, without being influenced, during the "driver interaction" system reaction.

If step S4 has detected that the driver activity is above the low range, the method is continued in step S5 by checking whether the intensity of driver intervention 8 is within the middle range. If the response to this query is affirmative, the "standard shutdown" system reaction S9 is triggered. The "standard shutdown" system reaction provides that all actuators 3, 301, 302 are deactivated by way of a standard shutdown. In accordance therewith, it is desired for all vehicle guidance systems to be deactivated based on the intensity of the driver intervention, but the deactivation does not need to occur so quickly that the regulation systems are instantaneously terminated; instead, the respective actuators are deactivated by way of usual shutdown processes such as ramp functions, in a manner that is convenient and secure in terms of driving events. This occurs in steps S9, S14, S15, and S16, by the fact that in step S14 the standard shutdown is triggered and then in step S15 the respective driver intervention is conveyed to the respective actuator. Shutdown of the actuator is executed in step S16.

If driver activity value 8 was to be assigned neither to the low nor to the middle range, step S6 checks whether driver activity value 8 is to be assigned to the highest range. If what was established in the context of the check in step S6 is that driver activity value 8 is within the highest range. In the case in which driver activity value 8 lies between threshold values H2 and H3, the method is continued in steps S10, S17, S18, and S20 or S21, by the fact that in step S10 an immediate shutdown is triggered for the actuator that received the intervention. As execution continues, the driver intervention is performed immediately by the actuator in step S17. All other actuators are deactivated selectably using a standard shutdown according to step S21 or an immediate shutdown in step S20.

The choice as to whether the other actuators are deactivated using an immediate shutdown according to step S20 or a standard shutdown according to step S21 can be stipulated either in the development phase by the system architect or in situation-dependent fashion, for example can be made dependent on further environmental parameters that are detected by way of environmental sensors.

If the highest range was also not selected in step S6, the method branches to transition S19 and returns to the beginning.

What is claimed is:

1. An apparatus for monitoring an activity of a driver of a vehicle, comprising:
   a device for monitoring an activity of a driver at a brake pedal and/or an accelerator pedal and/or a steering wheel, and for detecting the activity of the driver at the brake pedal and/or the accelerator pedal and/or the steering wheel as a driver intervention for influencing a vehicle motion; and a device for evaluating a driver activity intensity, wherein:
the device for evaluating evaluates the intensity of the respective driver activity with regard to an urgency of a respective vehicle reaction is evaluated,
the device is configured to determine, based on the intensity of the respective driver activity, a range selected from at least three different ranges, a first one of the ranges being a lowest range representing a lowest degree of urgency of the respective vehicle reaction relative to the other ranges, a second one of the ranges being a middle range, and a third one of the ranges being a highest range representing a highest degree of urgency of the respective vehicle reaction relative to the other ranges, the middle range representing a degree of urgency of the respective vehicle reaction between the lowest degree of urgency and the highest degree of urgency;
wherein the apparatus is configured to select at least one of at least three different system reactions depending on the determined range, and
wherein the apparatus is configured to execute the selected system reaction, the selected system reaction including one or more of the following: (i) control of at least one vehicle actuator based on the driver intervention, (ii) deactivation of control by an automated vehicle guidance system or driver assistance system of the at least one vehicle actuator and transfer of the control of the at least one vehicle actuator to the driver.

2. The apparatus as recited in claim 1, wherein the device for monitoring the activity of the driver includes one of:
a steering wheel angle sensor;
a brake pedal force sensor;
a brake pedal travel sensor;
an accelerator pedal force sensor;
an accelerator pedal travel sensor;
an occupant activity camera;
a switch-on/shutdown element;
a capacitive steering wheel sensor;
a steering wheel torque sensor; and
a combination thereof.

3. The apparatus as recited in claim 1, wherein the system reaction is one of:
an immediate shutdown;
a driver interaction;
a standard shutdown; and
a combination thereof.

4. The apparatus as recited in claim 3, wherein the immediate shutdown is a prompt shutdown of a current assistance system command, and wherein control of respective actuators is transferred to control of the driver.

5. The apparatus as recited in claim 3, wherein the immediate shutdown triggers one of a standard shutdown and an immediate shutdown at other actuators that are not affected by the immediate shutdown.

6. The apparatus as recited in claim 3, wherein the standard shutdown is a delayed shutdown of an all assistance system command, and wherein control of all actuators is transferred to control of the driver.

7. The apparatus as recited in claim 4 wherein upon driver interaction, the current assistance system command is performed depending on control by the driver.

8. The apparatus as recited in claim 7, wherein upon driver interaction, the current assistance system command continues to remain active.

9. The apparatus as recited in claim 1, wherein the intensity of the driver intervention is dependent on one of:
a driver actuation amplitude;
a driver actuation speed;
a driver actuation torque;
driver actuation acceleration;
an actuation of a driver operating element; and
a combination thereof.

10. The apparatus as recited in claim 1, wherein the apparatus is configured to:
(i) when the determined range is the lowest range, adapt a motion regulator of the at least one vehicle actuator to the driver intervention;
(ii) when the determined range is the middle range, transfer the control of the at least one vehicle actuator from the automated vehicle guidance system or the driver assistance to the driver in accordance with an driver intervention ramp having a defined increase, and execute the driver intervention; and
(iii) when the determined range is the highest range, immediately return control of the at least one vehicle actuator from the automated vehicle guidance system or the driver assistance to the driver, and execute the driver intervention.

11. A method for monitoring an activity of a driver of a vehicle, comprising:
monitoring an activity of a driver at a brake pedal and/or an accelerator pedal and/or a steering wheel and detecting the activity of the driver at the the brake pedal and/or the accelerator pedal and/or the steering wheel as a driver intervention for influencing a vehicle motion;
evaluating an intensity of the driver activity with regard to an urgency of a respective vehicle reaction,
determining, based on the intensity of the respective driver activity, a range selected from at least three different ranges, a first one of the ranges being a lowest range representing a lowest degree of urgency of the respective vehicle reaction relative to the other ranges, a second one of the ranges being a middle range, and a third one of the ranges being a highest range representing a highest degree of urgency of the respective vehicle reaction relative to the other ranges, the middle range representing a degree of urgency of the respective vehicle reaction between the lowest degree of urgency and the highest degree of urgency;
selecting at least one of three different system reactions depending on the determined range, and
executing the selected system reaction, the executing of the selected system reaction including one or more of the following: (i) controlling at least one vehicle actuator based on the driver intervention, (ii) deactivating control by an automated vehicle guidance system or driver assistance system of the at least one vehicle actuator and transferring the control of the at least one vehicle actuator to the driver.

12. The method as recited in claim 11, wherein a signal for monitoring the activity of a driver includes one of:
a signal of an occupant activity camera;
a switch-on/shutdown signal;
a steering wheel angle signal;
a brake pedal force signal;
a brake pedal travel signal;
an accelerator pedal force signal;

an accelerator pedal travel signal;
a capacitive steering wheel sensor;
a steering wheel torque sensor; and
a combination thereof.

13. The method as recited in claim 11, wherein the system reaction is one of:
an immediate shutdown;
a standard shutdown;
a driver interaction; and
a combination thereof.

14. The method as recited in claim 11, wherein the respective system reaction is triggered by a comparison of the intensity of the driver intervention with stored threshold values.

15. The method as recited in claim 11, wherein when the determined range for the intensity of the driver intervention is the lowest range, the driver interaction is triggered, a motion regulator of the respective actuator being adapted to the driver intervention, and the driver intervention being delivered to the respective actuator and being executed by the respective actuator.

16. The method as recited in claim 11, wherein when the determined range for the intensity of the driver intervention is the middle range, a respective standard shutdown is triggered for all actuators, and the driver intervention is delivered to the respective actuator and is executed by the respective actuator.

17. The method as recited in claim 11, wherein when the determined range for the intensity of the driver intervention is the highest range, an immediate shutdown is triggered and the driver intervention is delivered to the respective actuator and is promptly executed by the respective actuator, and the other actuators are shut down using one of a respective standard shutdown and a respective immediate shutdown.

18. The method as recited in claim 11, wherein when the determined range for the intensity of the driver intervention is one of above the highest range and below the lowest range, the method is cycled through again from the beginning without triggering a system reaction.

19. A computer program product that is configured to at least one of execute, implement, and control a method for monitoring an activity of a driver of a vehicle, the method comprising:
monitoring an activity of a driver at a brake pedal and/or an accelerator pedal and/or a steering wheel and detecting the activity of the driver at the the brake pedal and/or the accelerator pedal and/or the steering wheel as a driver intervention for influencing a vehicle motion;
evaluating an intensity of the driver activity with regard to an urgency of a respective vehicle reaction,
determining, based on the intensity of the respective driver activity, a range selected from at least three different ranges, a first one of the ranges being a lowest range representing a lowest degree of urgency of the respective vehicle reaction relative to the other ranges, a second one of the ranges being a middle range, and a third one of the ranges being a highest range representing a highest degree of urgency of the respective vehicle reaction relative to the other ranges, the middle range representing a degree of urgency of the respective vehicle reaction between the lowest degree of urgency and the highest degree of urgency;
selecting at least one of three different system reactions depending on the determined range, and
executing the selected system reaction, the executing of the selected system reaction including one or more of the following: (i) controlling at least one vehicle actuator based on the driver intervention, (ii) deactivating control by an automated vehicle guidance system or driver assistance system of the at least one vehicle actuator and transferring the control of the at least one vehicle actuator to the driver.

20. A non-transitory machine-readable memory medium on which a computer program is stored, the computer program being configured to at least one of execute, implement, and control a method for monitoring an activity of a driver of a vehicle, the method comprising:
monitoring an activity of a driver at a brake pedal and/or an accelerator pedal and/or a steering wheel and detecting the activity of the driver at the the brake pedal and/or the accelerator pedal and/or the steering wheel as a driver intervention for influencing a vehicle motion;
evaluating an intensity of the driver activity with regard to an urgency of a respective vehicle reaction,
determining, based on the intensity of the respective driver activity, a range selected from at least three different ranges, a first one of the ranges being a lowest range representing a lowest degree of urgency of the respective vehicle reaction relative to the other ranges, a second one of the ranges being a middle range, and a third one of the ranges being a highest range representing a highest degree of urgency of the respective vehicle reaction relative to the other ranges, the middle range representing a degree of urgency of the respective vehicle reaction between the lowest degree of urgency and the highest degree of urgency;
selecting at least one of three different system reactions depending on the determined range, and
executing the selected system reaction, the executing of the selected system reaction including one or more of the following: (i) controlling at least one vehicle actuator based on the driver intervention, (ii) deactivating control by an automated vehicle guidance system or driver assistance system of the at least one vehicle actuator and transferring the control of the at least one vehicle actuator to the driver.

* * * * *